Figure 1:
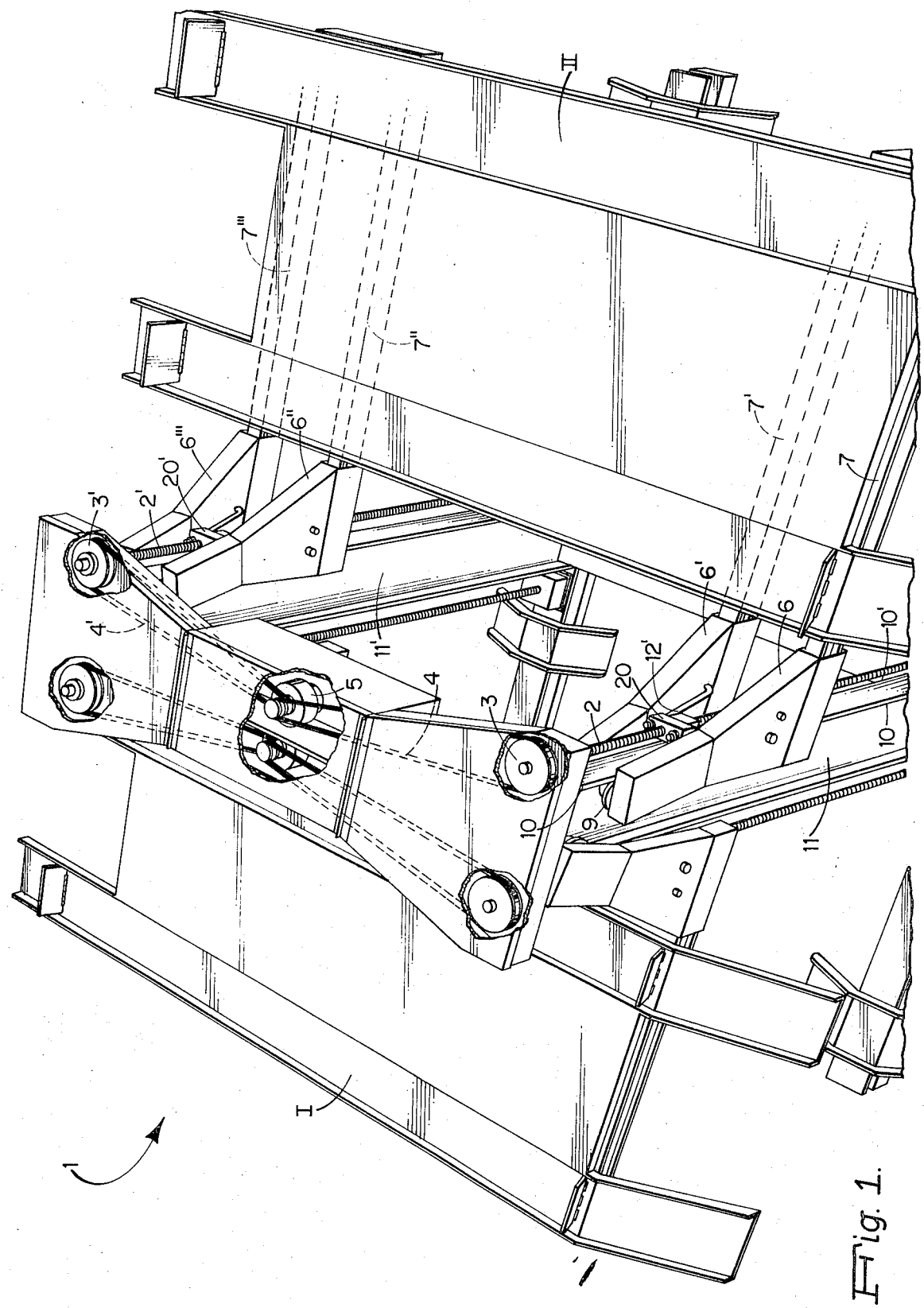

United States Patent [19]
Katz

[11] 3,799,292
[45] Mar. 26, 1974

[54] SCREW-NUT AND NUT FOLLOWER-CONTROLLED LIFT APPARATUS AND COMPONENTS

[75] Inventor: Leonhard Katz, Woburn, Mass.

[73] Assignee: Astro Dynamics, Inc., Burlington, Mass.

[22] Filed: Jan. 5, 1972

[21] Appl. No.: 215,576

[52] U.S. Cl................ 187/25, 74/459, 85/32 V, 254/103
[51] Int. Cl................ B66f 7/14, F16h 25/00
[58] Field of Search............... 187/24, 25; 74/459; 254/103, 89 R, 98; 277/24, 165; 85/32 R, 32 T, 32 V, 33

[56] References Cited
UNITED STATES PATENTS

| | | | |
|---|---|---|---|
| 2,663,929 | 12/1953 | Carpenter | 187/24 X |
| 3,309,060 | 3/1967 | Villars | 74/459 X |
| 3,121,340 | 2/1964 | Anthony | 74/459 |
| 1,986,620 | 1/1935 | Borden et al. | 187/24 |
| 3,302,750 | 2/1967 | Arnold | 187/95 UX |
| 2,843,222 | 7/1958 | Villars | 187/24 X |
| 3,669,460 | 6/1972 | Wysong | 277/24 |
| 3,116,931 | 1/1964 | Edwards | 277/165 |

*Primary Examiner*—Evon C. Blunk
*Assistant Examiner*—James L. Rowland
*Attorney, Agent, or Firm*—Rines and Rines; Shapiro and Shapiro

[57] ABSTRACT

This disclosure deals with novel screw and nut and nut follower mechanisms involving a plurality of in-line, resiliently mounted, independent nut segments adapted to follow long drive screws for such applications as controlling vehicular lifts and for more general uses, as well.

13 Claims, 3 Drawing Figures

SCREW-NUT AND NUT FOLLOWER-CONTROLLED LIFT APPARATUS AND COMPONENTS

The present invention relates to screw and nut and nut follower constructions, being more particularly directed to the use of long drive screws and associated nut and nut follower mechanisms for controlling vehicular lifts and for many other applications, as well.

Since the very early days of machinery, the screw and nut has been used for a myriad of applications including dynamic uses where the screw is rotated and the nut and nut follower construction carries with it a platform or other mechanism, the position of which is correspondingly varied along the drive screw in response to the rotational movement thereof. While the problem of fabricating close-tolerances long drive or lead screws has been admirably solved over the years for many applications, particularly those in the machine tool industry and the like, where very great bearing forces or loads are required to be moved or supported, such devices have not generally been employed. In the case of lifting mechanisms, for example, such as car lifts and the like, the peculiar problems resulting from the raising and lowering of very great loads, have seemed to contraindicate the use of such mechanisms; and resort has been had, rather, to other types of lifting, holding and releasing mechanisms.

While attempts have been made to use threaded drives in lift applications and the like, these have required special follower mechanisms and have generally not proven satisfactory in commercial application to garaging problems and the like. Other types of sliding and locking mechanisms have also had to be employed. Such prior techniques are illustrated, for example by United States Letters Pat. Nos. 1,519,357; 1,521,450; 2,682,958; 2,742,164; 2,826,312; 2,857,985; 2,915,143; 3,035,717; 3,263,831; 3,276,548; 3,372,816; and 3,426,540. Underlying the present invention is a discovery of a technique for widely distributing bearing forces which, unlike these systems, enables the use of a simple, reliable and highly safe nut structure, as contrasted with the mechanisms of the prior art.

The specific requirements in lifting heavy loads by means of long lead screws and the like employing conventional nuts, are several fold. First, it is necessary to make the screw mechanism "lock." This means that the force component which tries to unscrew the mechanism is less than the friction component generated in the surfaces between the nut and the drive screw. If at any time the thread angle becomes sufficiently steep, a point is reached at which a circumferential force component equals the friction force. Above this point, the screw will unthread itself; but below that point, it remains self-locked and will not unscrew. Secondly, a complication is introduced by the fact that the friction in screws and nuts of the type described is a function of the nut construction and of the lubricant used for maximum sliding conditions. The friction coefficient quite often is a function of the normal pressure, although up to a certain level of pressure, it usually remains constant. What actually happens, however, is that the first two threads of the nut carry most of the load, with the remaining threads supporting very little load. Consequently, in a conventional nut construction, the entire load can be considered as being distributed over the surface area in contact with the first two threads. This usually results in very high loads for that area, causing an increase in friction coefficient and, in addition, being so inefficient in wear, as to require for the purposes of the present invention, such an enormous conventional nut construction as to render it impractical.

For vehicle lift applications and the like, for example, the design load, which must be continually and repeatedly encountered, is about 10,000 pounds. This is distributed over two drive screw nuts, requiring 5,000 pounds to be supported per nut. With a screw diameter of approximately 2 inches and a thread depth of approximately one-eighth inch, consequently, the first two threads supporting most of the load will have a total bearing area of about 1.7 square inches, representing a bearing pressure of 3,200 psi. This far exceeds most recommended practices. It is necessary if reasonable wear and efficiency is to be maintained to have a bearing pressure of say, less than 1000 psi. It is for this primary reason, indeed, that such lead screw and nut systems, despite their simplicity and inherent reliability, were not used before the present invention for car lift and related applications, but resort has been had, rather, to entirely different hydraulic lift, slide and locking mechanisms.

An object of the present invention, accordingly, is to provide a new and improved screw-nut and nut follower combined construction that startingly overcomes the previously detailed inherent problems with such mechanisms employed for raising and lowering heavy loads and enables advantage to be taken of the simplicity, reliability, relative low cost and inherent safety of such constructions in heavy load-moving lifts and other systems.

A further object is to provide a novel screw and nut and nut-follower construction of more general utility, as well.

Still another object is to provide a novel vehicular lift apparatus, particularly adapted for employing such novel construction.

Other and further objects will be explained hereinafter and are more particularly delineated in the appended claims. In summary, however, from one of its aspects, the invention contemplates a novel screw and nut and nut-follower-controlled lift apparatus with novel nut and nut-follower construction in accordance with which distributed, independently and resiliently mounted, successive short nut segments are employed to enable distribution of otherwise intolerable loading. Preferred constructional details are hereinafter set forth.

Figure 2:
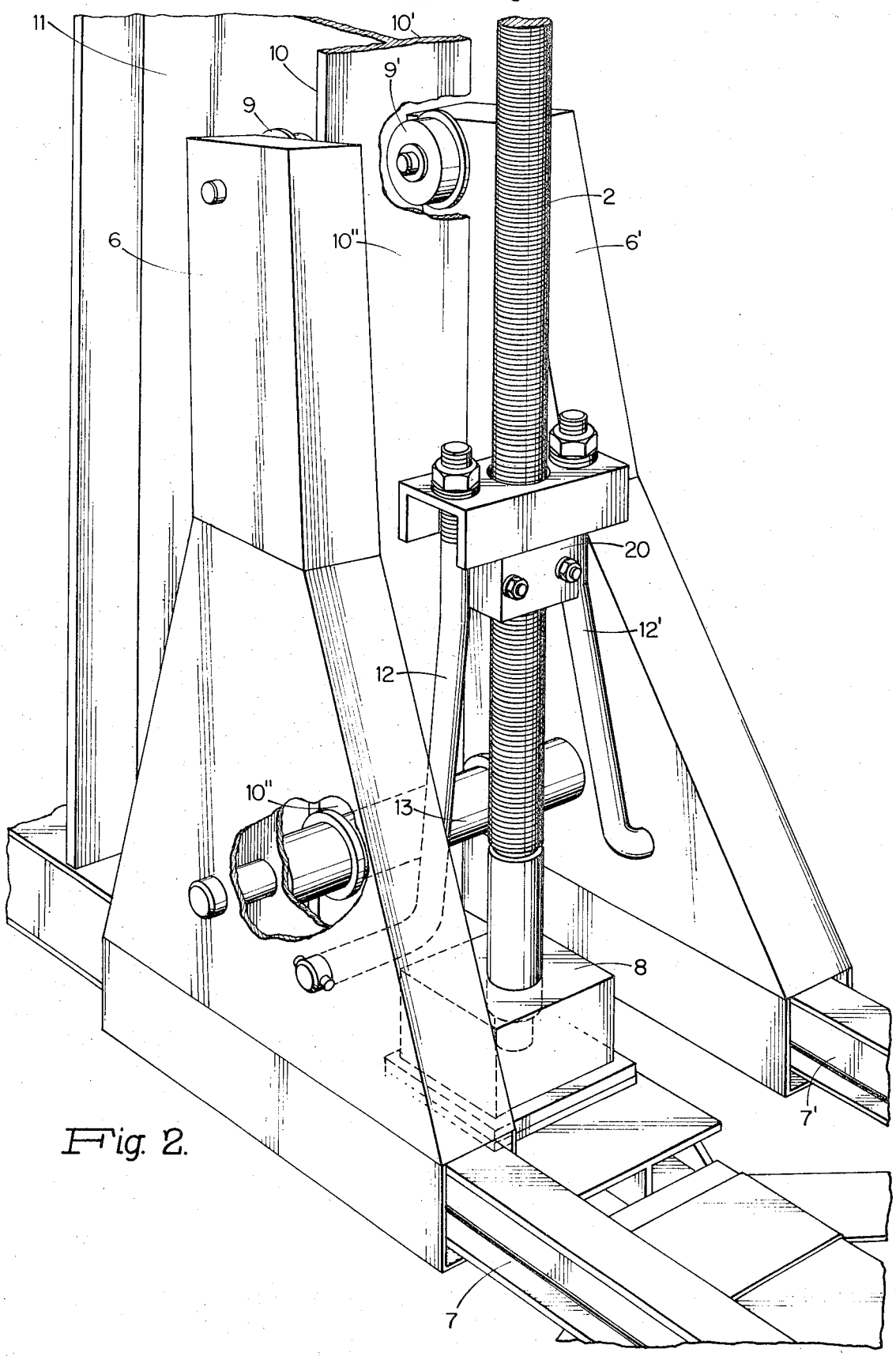
Figure 3:
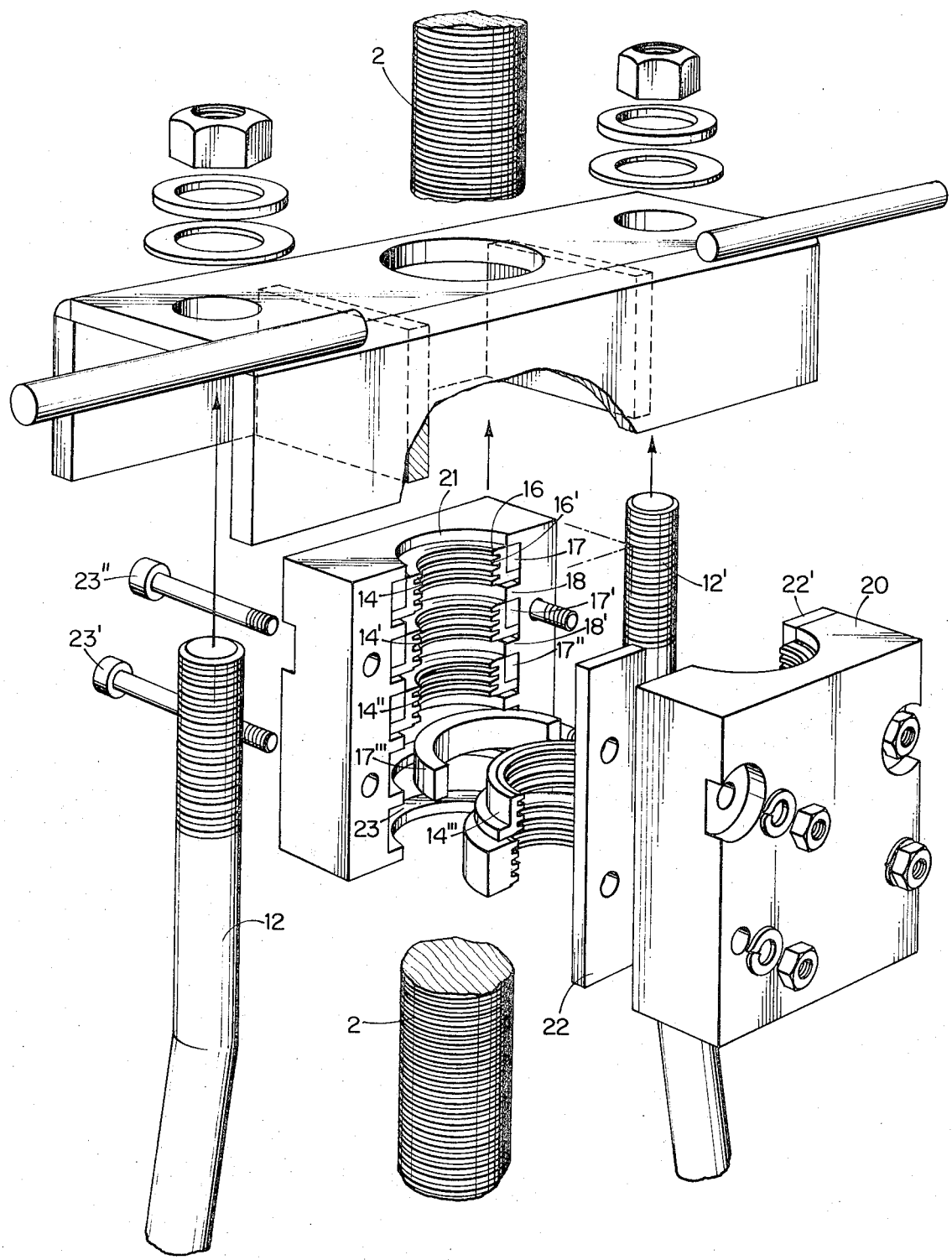

The invention will be described with reference to the accompanying drawing,

FIG. 1 of which is a top isometric view, partly broken away to show details of construction, and illustrating the invention as applied to the problem of supporting a car-lift elevating mechanism and the like;

FIG. 2 is a fragmentary side isometric view upon a larger scale, of a preferred lead screw and nut elevating mechanism for use in applications such as the system of FIG. 1; and FIG. 3 is a view similar to FIG. 2, in expanded diagrammatic form, illustrating the details of the novel nut and follower mechanism of the invention as employed in the system of FIGS. 1 and 2 and more generally useful in other applications, as well.

Referring to FIG. 1, a dual car lift is shown comprising two pairs of vehicle-supporting platforms comprising channels I and II mounted back to back on opposite sides of a top drive mechanism generically indicated at 1 and comprising four lead screws, two of which are more clearly shown at 2 and 2', for the right-hand system, driven from respective sprocket drives 3 and 3' by timing belt members 4 and 4' passed over the shaft of a centrally positioned drive motor 5 to rotate the drive screws in opposite directions in order to raise or lower the platform channels. Rotation of the long lead screws 2 and 2' will cause corresponding nut and follower mechanisms 20 and 20' to move vertically up or down the lead screws 2 and 2' and to carry with them side carriages 6–6' and 6''–6''' secured to opposite sides of the respective nut follower mechanisms 20 and 20' and forwardly supporting the vehicle chanels II by supporting beams 7–7' and 7''–7''' extending forwardly from the side carriages 6–6' and 6''–6''', respectively. Similar construction is employed in the left-hand system embodying channels I.

As more particularly shown in FIG. 2, the bottom of each lead screw, such as the vertical lead screw 2, is supported in a bottom bearing 8, preferably of the tapered-roller bearing type. While a similar bearing may be used at the top, it is preferred there to employ a conventional self-aligning roller bearing, not shown. The side-carriages 6 and 6' are illustrated as provided in their interior faces with upper wheels 9 and 9' and a lower roller 13 which respectively engage and ride along the flanges 10 and 10' on the inner or rearward surface of an I-beam 11, vertically parallel to the drive screw member 2, with the roller 13 riding on the opposite or front surface 10''. Similar I-beam supports are associated with the other lead-screw structures as illustrated in FIG. 1 and 11' in connection, for example, with the lead screw 2'. Gimbal-like supporting tension rods are provided at 12 and 12' to transmit the lifting force from the nut 20 to the side carriages 6 and 6'.

It now remains to explain the preferred construction of the distributed nut and follower of the present invention contained in the assembly 20 that enables the problems underlying the present invention to be so admirably solved, and this will be done more particularly in connection with the expanded view of FIG. 3 illustrating the system 2–20, though it will be understood that similar constructions will be used in connection with the other lead screws and nut systems of the lift structure. Referring to FIG. 3, the nut housing 20 is shown constructed in the form of mating semi-cylindrical halves containing four sets of independent semi-cylindrical mating half nuts 14, 14', 14'' and 14''', previously termed distributed nuts. Each half-nut contains two dual threads shown at 16 and 16' in connection with the nut 14. Each half-nut is independently supported by means of semi-cylindircal respective resilient rings 17, 17', 17'', and 17''', as of rubber, distributed within a cylindrical aperture or bore 21 centrally disposed through the nut housing 20. As before explained, the half-nut sections 14, 14', 14'' and 14''' are closely spaced longitudinally from one another at substantially equally spaced regions within the bore between successive ribs 18, 18' etc. which are of greater diameter than the nut threads and thus enable engagement of the nut with the threads of the lead screw 2 at corresponding spaced locations, for the purposes before-described. The resilient inserts 17, 17', 17'' and 17''' externally hold the nut segments independently resiliently against the bore wall and enable independent self-adjustment of the plurality of half-nut structures and independent self-alignment. An optional fifth wiper space 23 is shown provided for catching dripping lubricant, and it may contain a rubber or other wiper nut for aiding in such function.

A planar separator 22–22', with or without rubber cushioning or other spring loading, is threadly locked between the two mating halves of the housing 20, as by locking screws 23'–23'', serving to prevent rotation of the mating half-nuts due to the fricitional force imparted by the lead screw 2 as the lead screw rotates, and causing the distributed nut mechanisms 20 to elevate and lower there-along. This construction permits slightly different alignment adjustments, enabling the long drive screw 2 to change alignment or laterally shift without affecting the efficiency of the nutfollowing action.

In actual car-lift installations employing height lifts of from 64–68 inches, a dual-car unit width of 17 feet and a load capacity of 10,000 pounds, each side, the four half-nut structures of FIGS. 1–3 have been successfully employed with great reliability and safety, the load being substantially equally shared by the first two complete threads of the four actual threads in each half-nut segment, reducing the load from the before-mentioned 3,200 psi to 400 psi.

For the 5,000 pound load, before mentioned, furthermore, each nug segment may move as much as a quarter of an inch under load, so that tolerances of the order of 0.005 inch for the nut itself are quite small in comparison therewith.

As before stated, while the distributed nut and follower mechanism of the invention is particularly suited to the specific problem of car lifts and the like, the construction and resulting novel properties and characteristics enable its use in a host of other applications, as well, that have somewhat similar problems, such as, for example, use in compactors, other types of lifting mechanisms, jacks, elevators and similar apparatus. While four half-nut structures have been described for the whole lift application, clearly more or less than four may be employed depending upon the forces, length of lead screw and other requirements of the specific application.

Further modifications will occur to those skilled in this art and all such are considered to fall within the spirit and scope of the invention as defined in the appended claims.

What is claimed is:

1. A screw and nut and nut-follower-controlled lift apparatus having, in combination, platform means for receiving an object to be raised and lowered; drive screw means provided with drive means for rotating the same in opposite directions; distributed nut and nut-follower means engaging the drive screw means and driven thereby upward and downward therealong; and means for connecting the distributed nut and nut follower means to support the platform means and to carry the same therewith along the drive screw means; the distributed nut and nut follower means comprising a nut housing containing a bore, a plurality of similar independent threaded nut segments, each having several thread turns discontinuous from the turns of the others, distributed longitudinally at successively closely spaced regions within the bore and receiving and threadedly engaging corresponding successive regions of said drive screw means, each nut segment being mounted upon the nut housing and transmitting platform load forces therefrom through the nut segment to said drive screw means in cooperation with the other nut segments, each nut segment having external resilient insert means between its outer surface and the bore to enable independent self-adjustment and alignment with the corresponding successive adjacent regions of the engaged drive screw means.

2. A screw and nut and nut-follower-controlled lift as claimed in claim 1 and in which the connecting means comprises wheeled carriage means secured to the said nut housing and movable along flange means disposed along and substantially parallel to said drive screw means, said carriage means being provided with outwardly extending supporting beams for supporting said platform means.

3. A screw and nut and nut-follower-controlled lift as claimed in claim 2 and in which said flange means comprises a pair of rearward flange edges and a front surface, said carriage means comprising a pair of members spaced on opposite sides of said nut housing with wheels thereof riding on the rearward flange edges and roller means riding on said front surface.

4. A screw and nut and nut-follower-controlled lift as claimed in claim 3 and in which said carriage means is connected to said nut housing by gimbal-like tension rod means depending from said nut housing to transmit lifting force from the nut housing to said carriage means.

5. A screw and nut and nut-follower-controlled lift as claimed in claim 1 and in which said housing comprises two mating members with semi-cylindrical portions of said bore and each nut segment comprises a pair of mating semi-cylindrical half-nut segments with corresponding semi-cylindrical resilient insert means.

6. A screw and nut and nut-follower-controlled lift as claimed in claim 1 and in which the nut segments are longitudinally separated along the bore by ribs of greater diameter than the threads of the nut segments.

7. A screw and nut and nut-follower-controlled lift as claimed in claim 1 and in which each nut segment has two substantially complete adjacent thread turns.

8. A screw and nut and nut-follower-controlled lift as claimed in claim 1 and in which said bore is provided with a further lubricant wiper segment beyond said nut segments.

9. A distributed nut and follower construction having, in combination, a nut housing containing a bore, a plurality of similar independent threaded nut segments, each having several thread turns discontinuous from the turns of the other, distributed longitudinally at successively closely spaced regions within the bore, means mounting each nut segment upon said housing for transmitting load forces from said housing to the threads of the nut segment in co-operation with the other nut segments, each nut segment having external resilient insert means between its outer surface and the bore to enable independent self-adjustment and alignment.

10. A distributed nut and follower construction as claimed in claim 9 and in which the housing comprises two mating members with semi-cylindrical portions of said bore and each nut segment comprises a pair of mating semi-cylindrical half-nut segments with corresponding semi-cylindrical resilient insert means.

11. A distributed nut and follower construction as claimed in claim 9 and in which the nut segments are longitudinally separated along the bore by ribs of greater diameter than the threads of the nut segments.

12. A distributed nut and follower construction as claimed in claim 9 and in which each nut segment has two substantially complete adjacent thread turns.

13. A distributed nut and follower construction as claimed in claim 9 and in which said bore is provided with a further lubricant wiper segment beyond said nut segments.

* * * * *